United States Patent
Sapir (10) Patent No.: US 10,502,949 B2
(45) Date of Patent: Dec. 10, 2019

(54) MULTI-POLYGON LASER SCANNER COMPRISING PYRAMIDAL TIMING POLYGON

(71) Applicant: Irvine Sensors Corporation, Costa Mesa, CA (US)

(72) Inventor: Itzhak Sapir, Irvine, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 50 days.

(21) Appl. No.: 16/010,830

(22) Filed: Jun. 18, 2018

(65) Prior Publication Data

US 2019/0310469 A1    Oct. 10, 2019

Related U.S. Application Data

(63) Continuation-in-part of application No. 15/944,978, filed on Apr. 4, 2018.

(51) Int. Cl.
*G02B 26/12* (2006.01)
*G01S 7/481* (2006.01)

(52) U.S. Cl.
CPC .......... *G02B 26/124* (2013.01); *G01S 7/4817* (2013.01)

(58) Field of Classification Search
CPC .. G02B 26/124; G02B 26/123; G02B 26/127; G01S 7/4817
USPC ................. 359/216.1–219.2, 202.1, 203.1
See application file for complete search history.

(56) References Cited

U.S. PATENT DOCUMENTS

| | | | | |
|---|---|---|---|---|
| 3,435,213 A | * | 3/1969 | Garrett | G01N 21/6408 250/458.1 |
| 3,602,572 A | * | 8/1971 | Norris, Jr. | H04N 3/08 359/202.1 |
| 3,812,325 A | * | 5/1974 | Schmidt | B61L 25/041 235/454 |
| 4,113,367 A | * | 9/1978 | Fritzler | G03B 41/06 352/105 |
| 4,413,878 A | * | 11/1983 | Lettington | H04N 3/09 348/E3.01 |
| 4,432,511 A | * | 2/1984 | Tong | F41G 7/26 244/3.13 |
| 4,537,465 A | * | 8/1985 | Sherman | G02B 27/0031 359/203.1 |
| 4,733,072 A | * | 3/1988 | Lettington | G01S 7/4817 250/235 |
| 5,006,721 A | * | 4/1991 | Cameron | G01S 7/4811 250/559.16 |
| 5,268,745 A | * | 12/1993 | Goody | G01J 3/433 250/339.13 |

(Continued)

*Primary Examiner* — Jennifer D. Carruth
(74) *Attorney, Agent, or Firm* — W. Eric Boyd, Esq.

(57) ABSTRACT

A LIDAR system comprising a pyramidal timing polygon is having a plurality of flat optically reflective facet surfaces. The pyramidal polygon comprises a plurality of spaced apart apertures disposed about the outer circumference thereof to define the plurality of radially disposed facets. The pyramidal polygon is rigidly attached and aligned with the rotating scanning polygon structures to define a pre-defined angular shift. The rotation of the three polygon assemblies is synchronized with a pulsed laser source whereby, for each laser pulse, the individual pyramid facets are disposed at a pre-determined angle, such as a 45 degree angle, with respect to the incoming beam so as to direct it along the beam 1 reflective optical path.

1 Claim, 13 Drawing Sheets

(56) References Cited

U.S. PATENT DOCUMENTS

| | | | | |
|---|---|---|---|---|
| 6,292,285 | B1* | 9/2001 | Wang | G02B 5/09 347/243 |
| 6,734,900 | B2* | 5/2004 | Mayhew | H04N 5/232 348/207.11 |
| 2002/0080503 | A1* | 6/2002 | Hatakeyama | G02B 5/09 359/850 |
| 2002/0140924 | A1* | 10/2002 | Wangler | G01S 7/4802 356/28 |
| 2003/0035188 | A1* | 2/2003 | Tominaga | G01S 7/4811 359/224.1 |
| 2007/0153349 | A1* | 7/2007 | Itami | G02B 26/121 359/216.1 |
| 2007/0218174 | A1* | 9/2007 | Hanamatsu | G01G 19/4146 426/231 |
| 2008/0055690 | A1* | 3/2008 | Nakamura | G02B 26/123 359/203.1 |
| 2008/0297870 | A1* | 12/2008 | Kobayashi | G02B 26/124 359/203.1 |
| 2010/0020377 | A1* | 1/2010 | Borchers | G02B 26/123 359/216.1 |
| 2016/0047896 | A1* | 2/2016 | Dussan | G01S 17/936 356/4.01 |
| 2017/0184705 | A1* | 6/2017 | Fujii | G02B 5/09 |
| 2017/0261743 | A1* | 9/2017 | Kim | G02B 26/10 |
| 2017/0293138 | A1* | 10/2017 | Ishikawa | G01S 7/481 |
| 2018/0372491 | A1* | 12/2018 | Noguchi | G01C 3/06 |
| 2019/0041500 | A1* | 2/2019 | Isono | G01S 7/4813 |
| 2019/0041501 | A1* | 2/2019 | Noguchi | G01S 7/42 |
| 2019/0250270 | A1* | 8/2019 | Suzuki | G01S 7/4817 |

* cited by examiner

MULTI-POLYGON LASER SCANNER COMPRISING PYRAMIDAL TIMING POLYGON

CROSS-REFERENCE TO RELATED APPLICATIONS

This application is a continuation-in-part (CIP) and claims the benefit of U.S. patent application Ser. No. 15/944,978, filed on Apr. 4, 2018 entitled "Multi-Polygon Laser Scanner", which entire application is incorporated fully herein by reference.

STATEMENT REGARDING FEDERALLY SPONSORED RESEARCH AND DEVELOPMENT

N/A

DESCRIPTION

1. Field of the Invention

The invention relates generally to the field of LIDAR systems. More specifically, the invention relates to a LIDAR system comprising a multi-polygon laser scanner assembly and optically-reflective rotating beam switching and steering assembly comprising a pyramidal timing polygon that enables complete laser beam scan utilization with no scanning dead period.

2. Background of the Invention

In certain prior art LIDAR systems, a rotating polygon assembly comprising one or more optically-reflective lateral surfaces or facets is used to steer or scan a laser source such as a laser beam over an area of interest. In order for the polygon to scan the full area of the beam over the scene of interest without cropping a portion of the beam at the facet edges, each facet must cover an angle larger than the desired angle of the scan. This results in a mismatch between the desired scan angle and the slice angle of each of the facets. As a consequence, an undesirable "dead period" is created in the scan cycle; i.e., a dead period during polygon rotation that occurs during the time occurring between one facet leaving the desired scan angle and the next facet entering it.

During this "dead period", no facets are available to steer the beam at the desired angle and both the entering and exiting facets in the beam-incident area tend to steer a varying area of the beam at an incorrect or undesired angle, resulting in a period in which the target is not illuminated.

In certain mission-critical LIDAR applications such as airborne collision avoidance, military reconnaissance or autonomous automotive applications, this "dead period" is unacceptable and must be minimized or eliminated.

In prior art single rotating polygon systems having facets large enough to meet the full beam area requirement as described above, the polygon facet size or geometry may become too large and polygon size and geometry becomes a determining factor over concerns with the above referenced "dead period". The instant invention addresses both of these deficiencies found in prior art polygon scanner LIDAR systems.

Another prior art LIDAR laser beam scanning mechanism utilizes a "galvo mirror". A galvo mirror is a flat mirror that is large enough to steer the full area of the system laser beam through a desired scan angle. A galvo mirror is typically mounted on a rotary reciprocating motor and is driven in a reciprocating scan motion. Galvo mirrors can address the size and "dead period" concerns of certain prior art scanning assemblies but are unfortunately limited in scan speed due to the galvo mirror's non-continuous reciprocating motion. Also, the power consumption in such a galvo mirror-based system tends to grow rapidly with increased scan rate, creating both power and thermal problems.

A further disadvantage of galvo mirrors is the shape of the scan they produce. Due to the reciprocating motion of the galvo mirror, the scanning beam scans the scene in a sine wave-shaped pattern which, when combined with the horizontal rotation found in many LIDAR applications, can leave illumination gaps in the scanned scene.

This undesirable feature in prior art systems is also addressed by the instant invention, which invention enables a laser beam scanner that is small, fast, low power, provides 100% scan utilization (no "dead period") and that produces a scan comprising a set of straight parallel lines that leave no gaps in an illuminated scene of interest.

BRIEF SUMMARY OF THE INVENTION

In a first aspect of the invention, a multi-polygon laser scanner for laser beam scanning is disclosed. The apparatus comprises a first scanning polygon structure having one or more first optically-reflective surfaces or facets defined on a first outer lateral surface of the first scanning polygon structure. The first aspect further comprises a second scanning polygon structure having one or more second optically-reflective surfaces or facets defined on a second outer lateral surface of the second scanning polygon structure. The first and second scanning polygon structures are coaxially mounted on a rotary shaft connected to an electric motor and have a fixed or adjustable angular relation between them.

The first aspect may comprise a rotating first optically-reflective beam steering element and a rotating second optically-reflective beam steering element. The first beam steering element comprises an optically-reflective conical surface having one or more radially-disposed apertures, slots, gaps or openings about its circumference to define a plurality of outwardly projecting, optically-reflective surfaces. The second beam steering element comprises an optically-reflective conical surface.

The first and second beam steering elements are coaxially mounted on the rotary shaft and rotate with the first and second scanning polygon structures. The first and second beam steering elements are configured so as to alternately direct or steer an incident scanning laser beam along different paths of travel. The first aspect may comprise a set of mirror or prism elements defining a beam guide mirror assembly to guide the beam or beams along different paths to be alternately scanned by the respective facets of the first and second scanning polygon structures.

In a second aspect of the invention, one or more reflective corrective lens elements are provided to correct beam distortion.

In a third aspect of the invention, one or more reflective corrective surfaces are provided to correct beam distortion.

In a fourth aspect of the invention, a one or more beam-forming elements is provided.

In a fifth aspect of the invention, one of the beam-forming elements may comprise a holographic lens element.

A sixth aspect of the invention comprises a first scanning polygon structure and a second scanning polygon structure each having multiple optically-reflective facets disposed on the outer lateral surfaces thereof. The first and second scanning polygon structures are mounted on a rotary shaft and have a fixed angular shift or offset between them. The sixth aspect comprises a laser beam optical switch configured to divert an incoming scanning laser beam to the rotating first or second scanning polygon structures so as to be alternately steered thereby.

A seventh aspect of the invention comprises first and second scanning polygon structures each having multiple optically-reflective facets disposed on the outer lateral surfaces thereof. The first and second scanning polygon structures are mounted on a rotary shaft and have a fixed angular shift or offset between them. The seventh aspect may comprise multiple laser beam sources such as a first laser beam source and a second laser beam source. Each of the first and second laser beam sources is directed toward a different one of the first or second scanning polygon structures and is configured to create a continuous double line laser scan pattern.

In an eighth aspect of the invention, the first and second laser beam sources are electronically controlled (i.e., switched on and off) to produce a single line scan pattern having a user-defined scan angle.

In a ninth aspect, a pyramidal timing polygon is disposed comprising a plurality of flat optically reflective facet surfaces. The pyramidal polygon comprises a plurality of spaced apart apertures disposed about the outer circumference thereof to define the plurality of radially disposed facets. The pyramidal polygon is rigidly attached and aligned with the rotating scanning polygon structures to define a pre-defined angular shift between them. The rotation of the three polygon assemblies is synchronized with a pulsed laser source whereby, for each laser pulse, the individual pyramid facets are disposed at a predetermined angle with respect to the incoming beam so as to direct it along the desired optical path.

In the ninth aspect of the invention, the LIDAR system comprises a laser source for emitting a beam along with an inner scanning polygon and an outer scanning polygon each comprising a plurality of facets disposed on a lateral surface thereof. A faceted beam steering element is provided comprising a plurality of outwardly depending, radially disposed, spaced apart beam switching surfaces defining a plurality of apertures there between. The faceted beam steering element, the inner scanning polygon and outer scanning polygon are all fixedly connected to each other and configured to rotate about a common axis. The inner scanning polygon and outer scanning polygon are provided with a predetermined angular shift between them. The beam is configured to be incident upon a stationary reflective surface when passing through the aperture at a first rotational position of the faceted beam steering element whereby the beam is directed along a first beam path comprising a facet of the inner or outer scanning polygon. The beam is incident upon a beam switching surface that is suitably angularly disposed t the beam when at a second rotational position of the faceted beam steering element whereby the beam is directed along a second beam path comprising a facet of the respective other inner or outer polygon.

The invention and its various embodiments can now be better understood by turning to the following description of the preferred embodiments which are presented as illustrated examples of the invention in any subsequent claims in any application claiming priority to this application. It is expressly understood that the invention as defined by such claims may be broader than the illustrated embodiments described below.

DETAILED DESCRIPTION OF THE INVENTION

Turning now to the figures wherein like references define like elements among the several views, Applicant discloses a LIDAR system comprising a multi-polygon laser scanner 1 that enables full beam scan utilization with no scanning dead period.

Figure 1A:
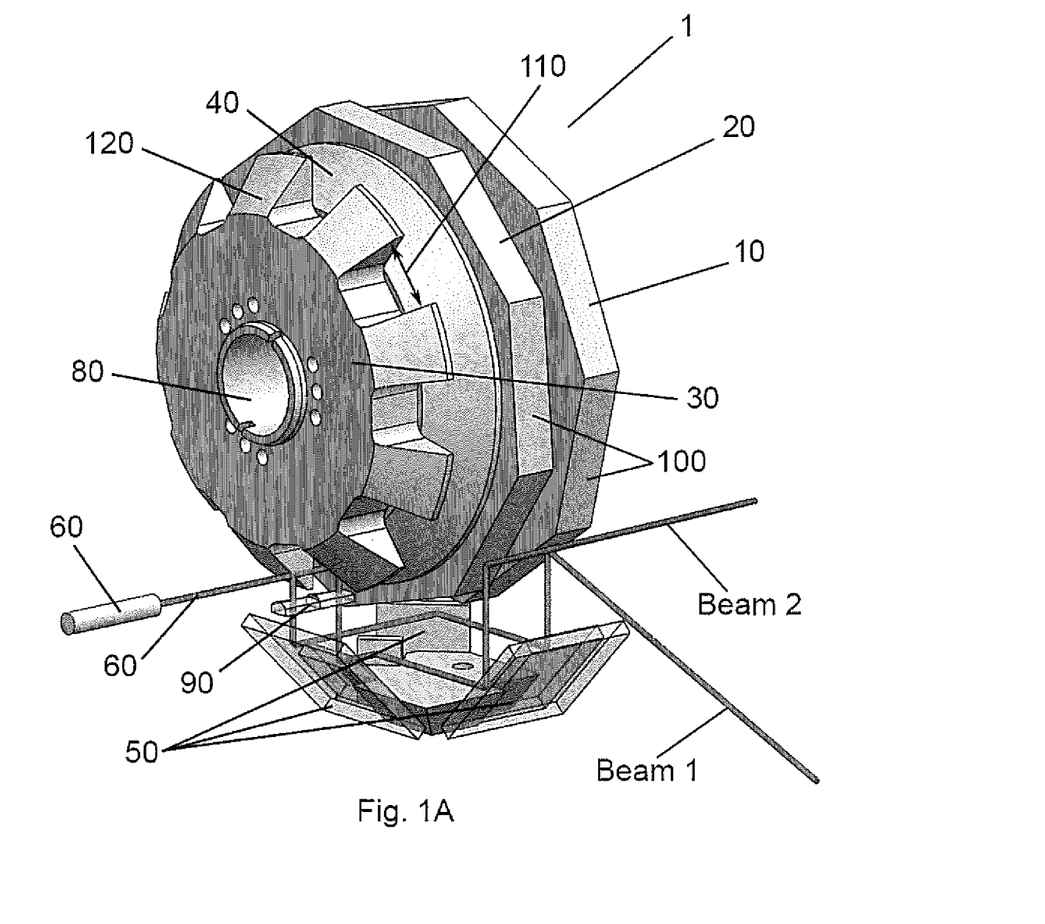
FIGS. 1A and 1B depict a preferred embodiment the multi-polygon laser scanner of the invention.
Figure 1B:
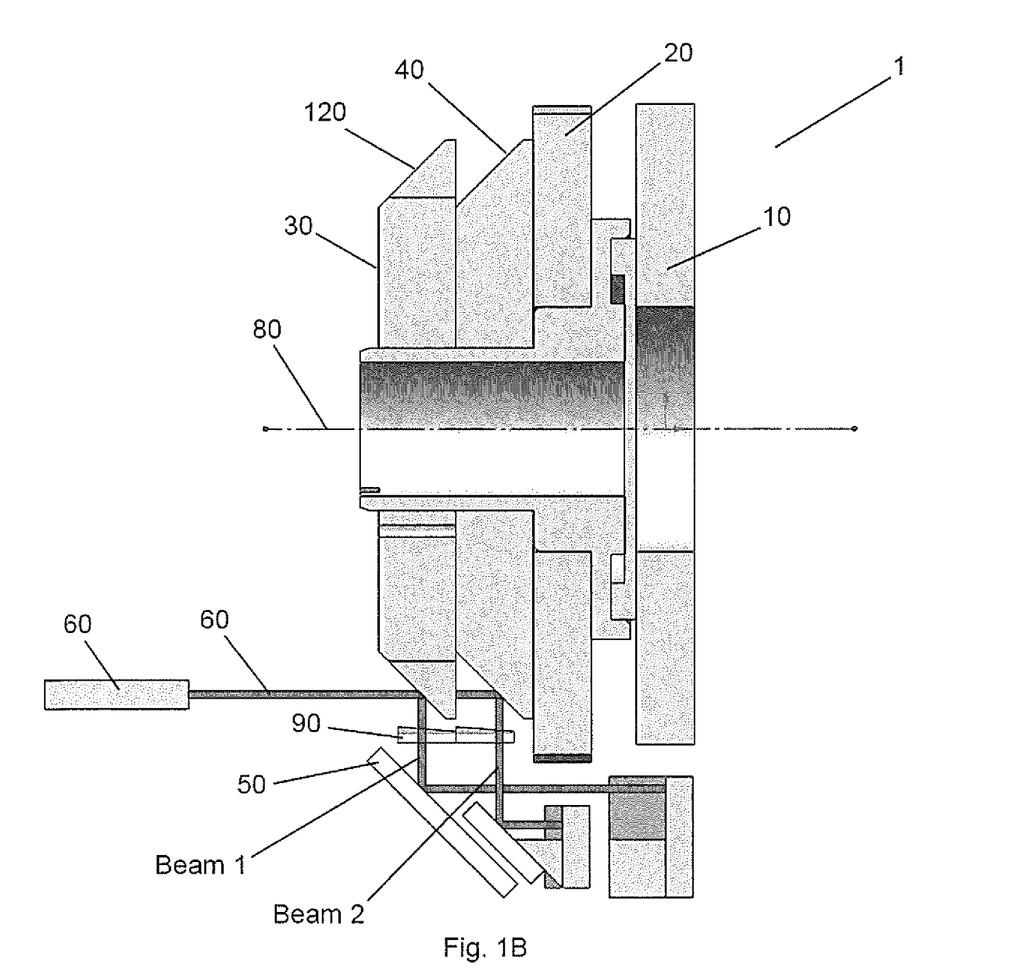

A preferred embodiment of multi-polygon laser scanner 1 of the current invention is depicted in FIGS. 1A and 1B and may be comprised of three main subassemblies; 1) a rotating double polygon structure comprising a first scanning polygon structure 10 and a second scanning polygon structure 20, 2) a rotating first beam steering element 30 and a rotating second beam steering element 40 that function in part as a timing/shutter assembly, and, 3) a beam guide mirror assembly 50.

A first laser source 60, electric rotary motor 70 comprising a rotary shaft 80, and a corrective lens element or corrective surface 90 (i.e., reflective corrective surfaces) may comprise further subassemblies of the apparatus of the invention.

An exemplar double polygon laser scanner 1 embodiment of the invention is illustrated in FIGS. 1A and 1B. First and second scanning polygon structures 10 and 20, each comprising a portion (such as one-half) of a user-desired number of optically-reflective facet elements 100 disposed on the respective lateral surfaces thereof, are provided. The number of facets would typically be as required to achieve a nominal desired scan angle in a comparable single scanning polygon structure.

First and second scanning polygon structures 10 and 20 are fixedly mounted on an electric motor-driven rotary shaft 80 (motor 70 not shown in FIG. 1A or 1B for clarity). The nominal scan angle for the respective facets 100 may be configured for a scan angle of a zero area beam. The configuration of the illustrated embodiment of FIGS. 1A and 1B is representative of a +/−20° beam scanner which, in a single scanning polygon design, would comprise 18 facets. For the disclosed embodiment of a double polygon laser scanner 1 having an equivalent scan angle, first and second scanning polygon structures 10 and 20 each comprise nine (9) facets 100. Each of first and second scanning polygon structures 10 and 20 is preferably mounted with a 20° rotational shift or offset between them in the illustrated, non-limiting exemplar embodiment.

Since respective first and second scanning polygon structures 10 and 20 comprise one-half the number of facets 100 of a prior art polygon LIDAR for a nominal scan angle, the invention desirably covers twice the nominal angle of a prior art LIDAR device with equivalent specifications. This in turn permits a laser beam size larger than zero to reside within a scanning facet at the end of the desired scan angle due to the fact the end is at a distance from the physical edges of facets 100. In prior art single polygon LIDAR designs, beam dimension (i.e., the beam diameter or beam length for a shaped beam) is a main design concern from which facet size and polygon overall size are derived.

For the purpose of polygon size comparison, the polygon diameter of the illustrated double polygon laser scanner 1 of FIGS. 1A and 1B may be less than one-half of the diameter of a prior art single polygon laser scanner having equivalent facet 100 size. In the illustrated embodiments of FIGS. 1A and 1B, the double polygon laser scanner diameter is about 40 mm, whereas the diameter of a single polygon with the same facet size would be about 82.6 mm.

A first beam steering element 30 and second beam steering element 40 define a timing-shutter/reflector wheel as double conical wheel assembly that is coaxially mounted on rotary shaft 80 with first and second scanning polygon structures 10 and 20.

First beam steering element 30 is comprised of a plurality radially spaced-apart apertures, gaps or openings 110 and a plurality of radially spaced-apart optically-reflective structures that outwardly extend out from the circumferential lateral surface of first beam steering element 30 to define a plurality of beam switching surfaces 120 that function as beam switching timing-shutter elements of the invention. First beam steering element 30 may comprise a plurality of evenly distributed, spaced-apart apertures, gaps or openings 110 that are radially disposed about the axis.

The number of apertures 110 may be equal to the number of facets 100 in each of first and second scanning polygon structures 20 and 30. In the illustrated embodiment, first beam steering element 30 comprises nine (9) apertures 110 and nine (9) beam switching surfaces 120. Beam switching surfaces 120 and the optically-reflective surface of second beam steering element 40 may be angularly disposed relative to the axis of rotation in order to direct an incident laser beam at about 90 degrees but any user-desired beam reflection angle is contemplated as falling within the scope of the claims herein.

First laser source 60 is preferably disposed whereby the laser beam 60' is incident upon the approximate radial center of a beam switching surface 120 as rotary shaft 80 rotates.

Beam 60' will be incident upon either optically-reflective beam switching surface 120 of first beam steering element 30 or the optically-reflective surface of second beam steering element 40 when an aperture 110 of first beam steering element 30 crosses the beam 60' path.

When beam 60' is incident upon one of the rotating beam switching surfaces 120, beam 60' is reflected at about 90°, preferably through a optically-corrective lens or upon an optically-corrective surface 90 and into beam guide mirror assembly 50. In this manner, beam 60' is guided into one of two paths to form beam 1 or beam 2 as shown in FIG. 1 as rotary shaft 80 rotates.

Figure 2A:
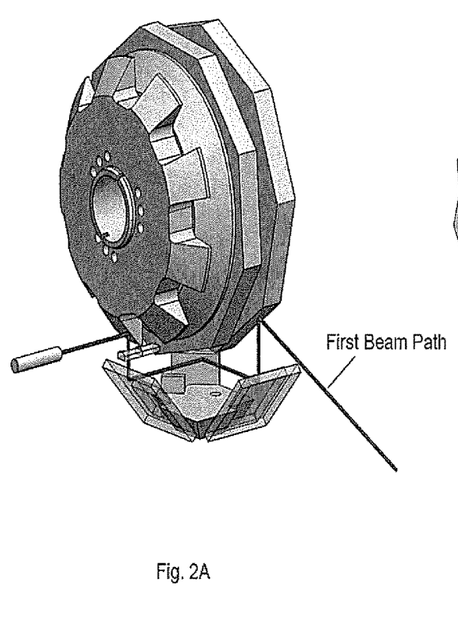
FIGS. 2A and 2B show a first beam path of a laser source of the invention.
Figure 2B:
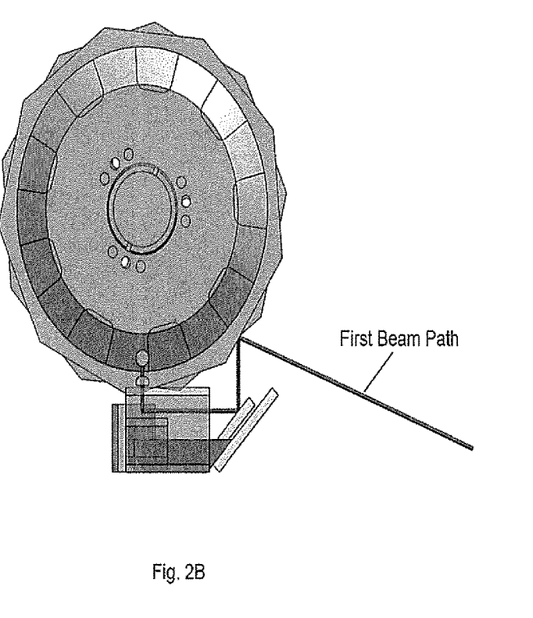

First and second scanning polygon structures 10 and 20 and first and second beam steering elements 30 and 40 rotate together at the same rotational speed. When one of the beam switching surface 120 passes in front of beam 60', beam 60' is reflected at a predetermined angle and enters beam guide mirror assembly 50 to form beam 1. Beam 1 is then steered by its respective scanning polygon structure in the double polygon assembly through the full scan angle. An exemplar beam 1 path is illustrated in FIGS. 2A and 2B.

Figures 3A, 3B:
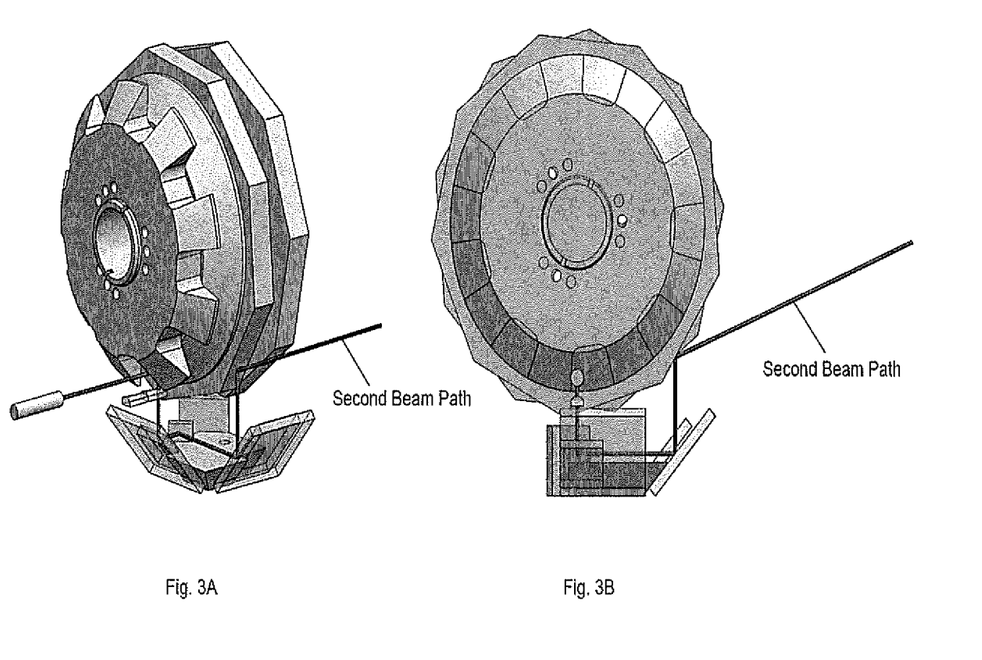
FIGS. 3A and 3B show a second beam path of a laser source of the invention.

When an aperture 110 in first beam steering assembly 30 passes in front of beam 60', beam 60' passes there through, and is reflected by the optically-reflective surface of second beam steering element 40 and through beam guide mirror assembly 50 to form beam 2. Beam 2 is then steered by its respective scanning polygon structure in the double polygon assembly through the full scan angle. An exemplar beam 2 path is illustrated in FIGS. 3A and 3B.

Because first and second scanning polygon structures 10 and 20 are disposed with an angular shift relative to each other of approximately one-half of the scan angle of each facet 100, each facet 100 entering the path of guided beam 60' is beneficially disposed at the precise angle as required to begin a new line scan where the previous line scan began. This in turn, creates a scene scan pattern of parallel straight beam lines, each starting and ending at the same angle.

Figure 4A:
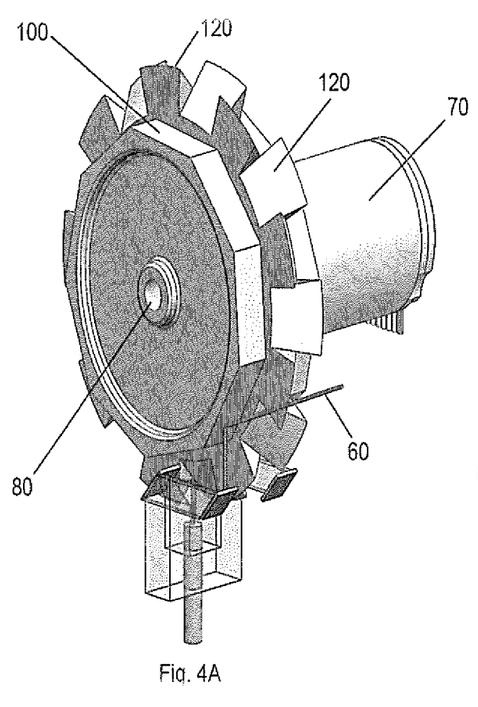
FIGS. 4A, 4B and 4C show preferred configurations of the multi-polygon laser scanner of the invention.
Figure 4B:
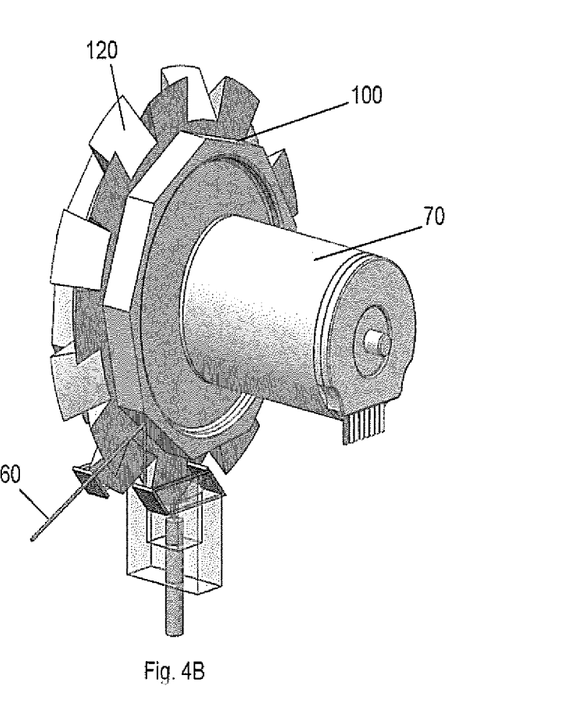
Figure 4C:
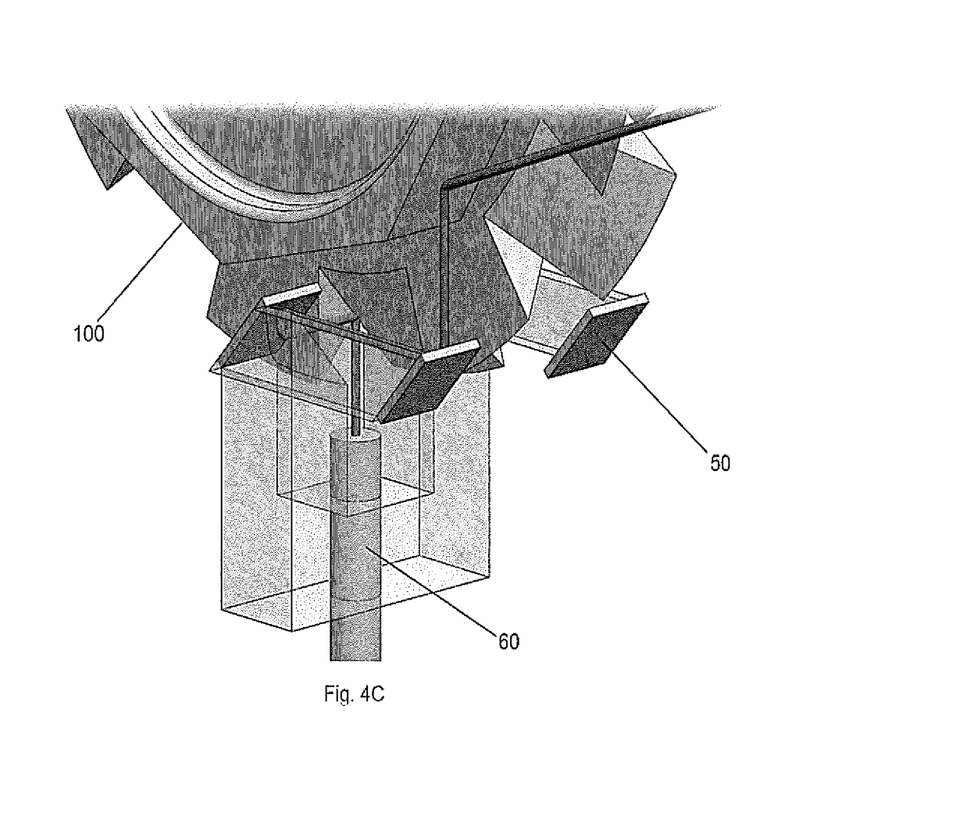

FIGS. 4A, 4B and 4C depict an alternative embodiment of the double polygon scanner 1 of the invention. The embodiment of FIGS. 4A, 4B and 4C is similar to the above described embodiment but instead of incorporating respective slotted and solid reflective conical wheels in the form of first beam steering element 30 and second beam steering element 40, the embodiment of FIGS. 4A, 4B and 4V comprises two rotating optically-reflective elements 30 and 30', each configured similarly to first beam steering element 30 wherein each beam steering element 30 and 30' comprises of a plurality of apertures, gaps or openings 110 and a plurality of optically-reflective structures that outwardly and radially extend from the circumferential lateral surface of beam steering elements 30 and 30' to define a plurality of beam switching surfaces 120 that function as system timing-shutter elements.

Such a configuration is symmetrical and beam 60' is incident upon respective beam switching surfaces 120 perpendicular to the axis of rotation and is reflected to the right and left thereof. This configuration may be implemented in different configurations as required by different applications and the configurations shown herein are merely means for explaining the principle of operation of the device.

In certain applications, it is desirable to form beam 60' to the shape of an imaging detector or focal plane array of multi-polygon scanner 1. This may be required for beam illumination optimization on a target. In these cases, a beam-forming element 130 such as a holographic lens element may be disposed in the path of each of beams 60' before they are incident upon their respective scanning polygon structures 10 and 20.

Figure 5:
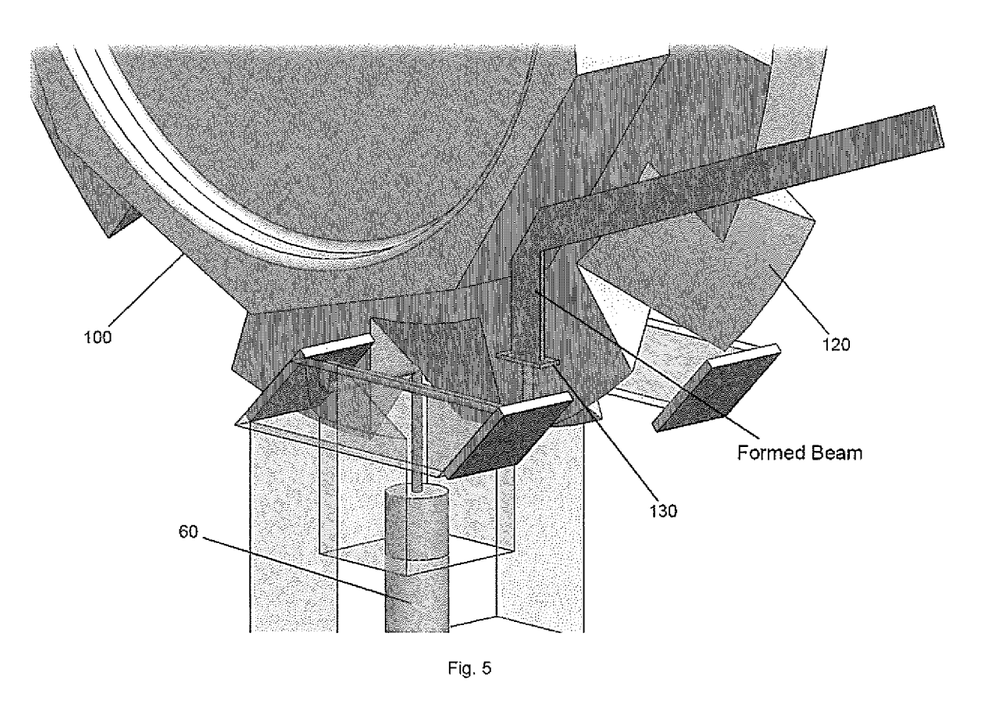
FIG. 5 shows a more detailed view of a beam-forming element in a symmetrical configuration of the multi-polygon laser scanner of FIG. 4.

FIG. 5 illustrates such a beam-forming element 130 which may be, for instance, a refractive or holographic beam-forming element.

FIG. 5 depicts a symmetrical configuration as previously discussed relative to FIGS. 4A, 4B and 4C, and is applicable to any user-defined configuration of the invention.

In the previously described embodiments, the laser beam switching between the two optical paths in the double polygon laser scanner enables the handling of a continuous laser beam hence incorporates multiple conical reflective surfaces. The purpose of using a conical timing wheel is to create a stationary beam reflection while also providing an optical switching element between the two beam paths that is coupled to the rotation angle.

An alternative embodiment of the invention that reduces fabrication and optical complexity by eliminating the need for conical distortion correction is disclosed for use with a pulsed laser beam source 60 in lieu of the above continuous laser beam. Such an embodiment permits the use of a faceted beam steering element similar to that previously disclosed but without the need for reflective conical surfaces and thus no need for conical distortion correction.

In the non-limiting illustrated embodiment of FIGS. 6A-C and FIGS. 7A-C, a pyramidal timing polygon in the form of a faceted beam steering element 230 is provided having a plurality of planar reflective surfaces in the form of optically reflective beam switching surfaces 120 and 120'.

The number, angle and spacing of beam switching surfaces 120 and 120' are user-defined parameters and may be varied by particular design or application needs. It is noted that the respective angles of the facets of the beam switching elements and the stationary reflective elements relative to each other and beam 60' along beam paths 1 and 2 are recited for purposes of illustration only and are not limiting such that any combination of angles may be used to project beam 60' of the invention along its desired path within the embodiment.

The pyramidal timing polygon/faceted beam switching element 230 of the embodiment of FIGS. 6A-C and 7A-C further comprises a plurality of openings or apertures 110 similar to the apertures in the previously described embodiments Faceted beam switching element 230 is rigidly attached to and aligned with rotating inner scanning polygon structure 210 and outer scanning polygon structures 220 each having a pre-defined angular shift between them.

As illustrated in FIGS. 6A-C and 7A-C, inner scanning polygon structure 210 and outer scanning polygon structures 220 are provided with a plurality of optically reflective facets 100 disposed on the outer lateral surfaces thereof for scanning a reflected laser beam on a scene of interest.

Figure 6A:
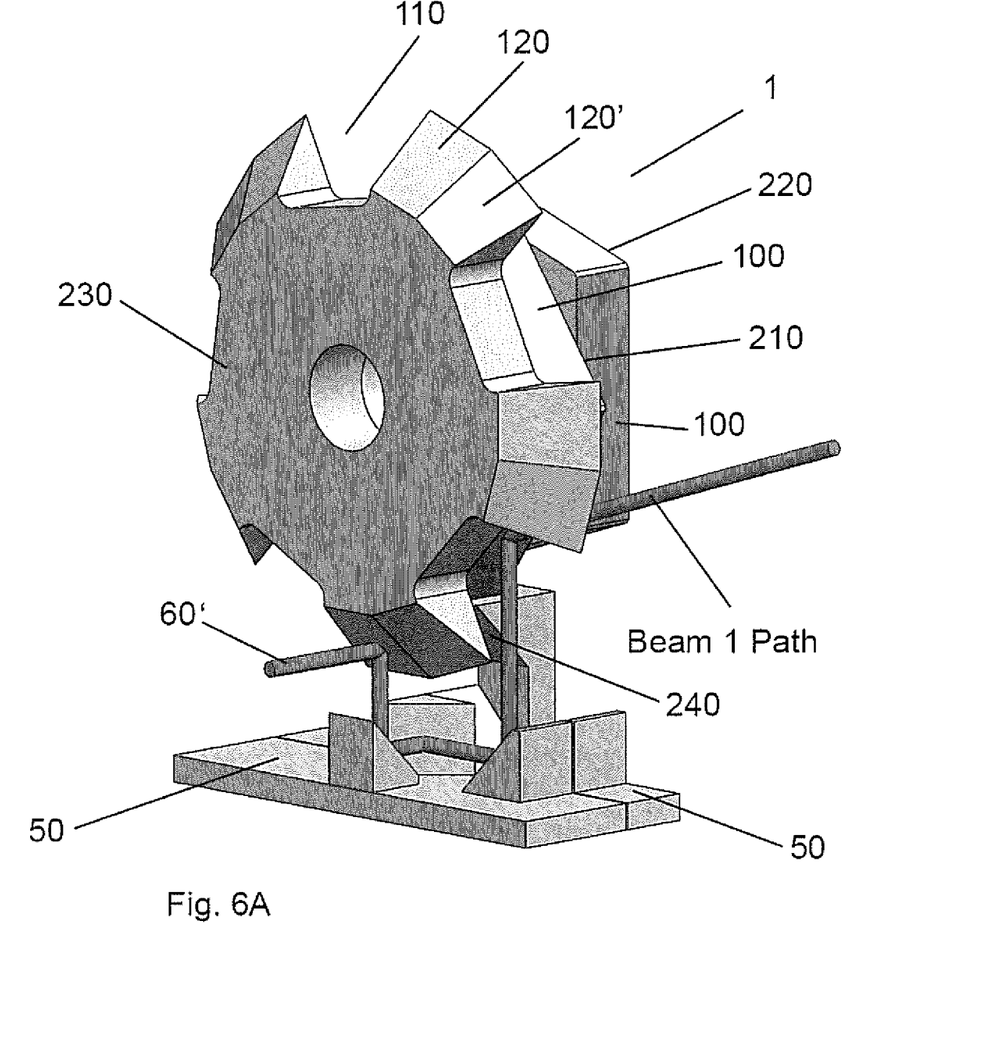
FIGS. 6A-C depicts an alternative embodiment of the invention comprising a pyramidal scanning polygon structure with a laser beam along a beam 1 path.
Figure 6B:
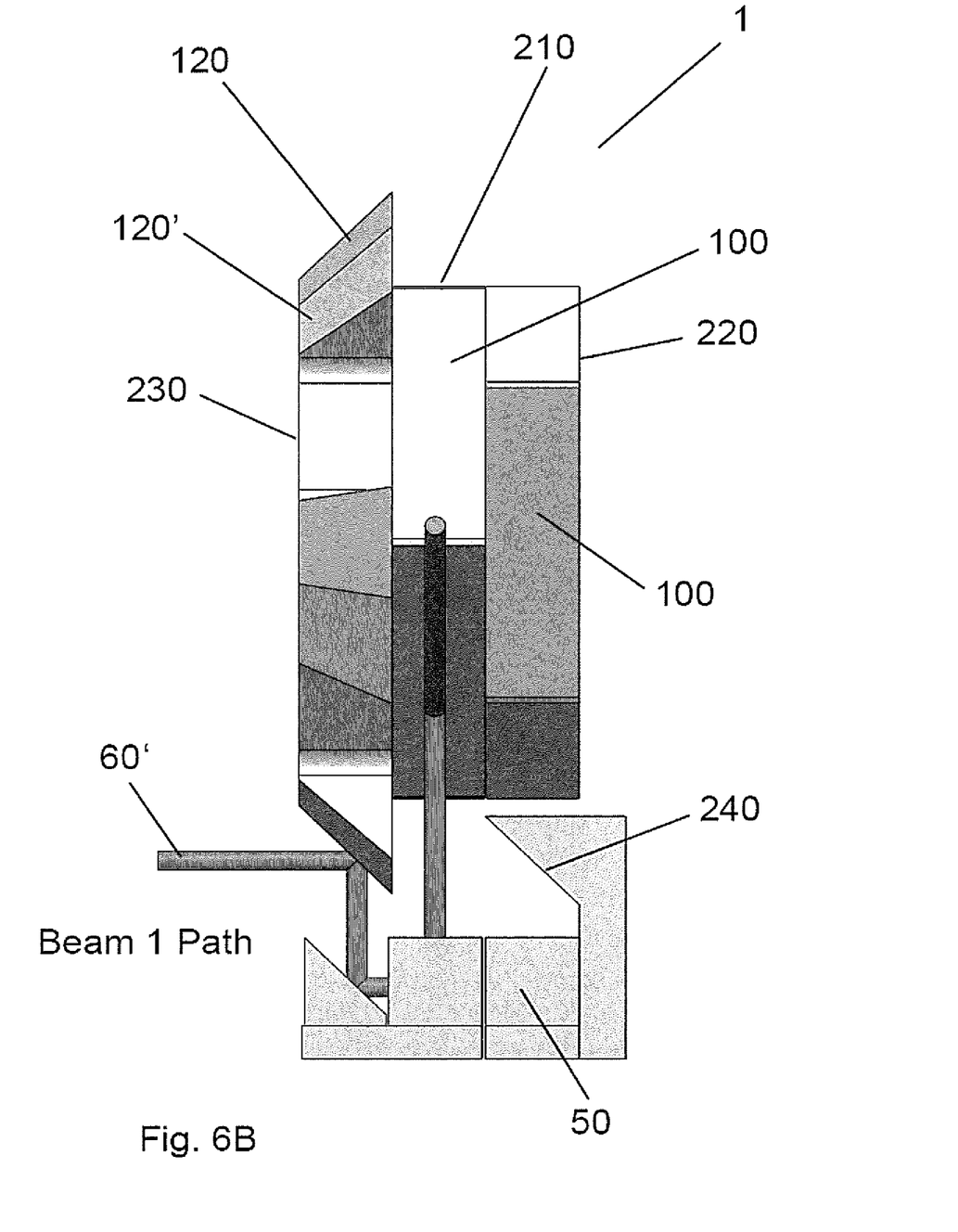
Figure 6C:
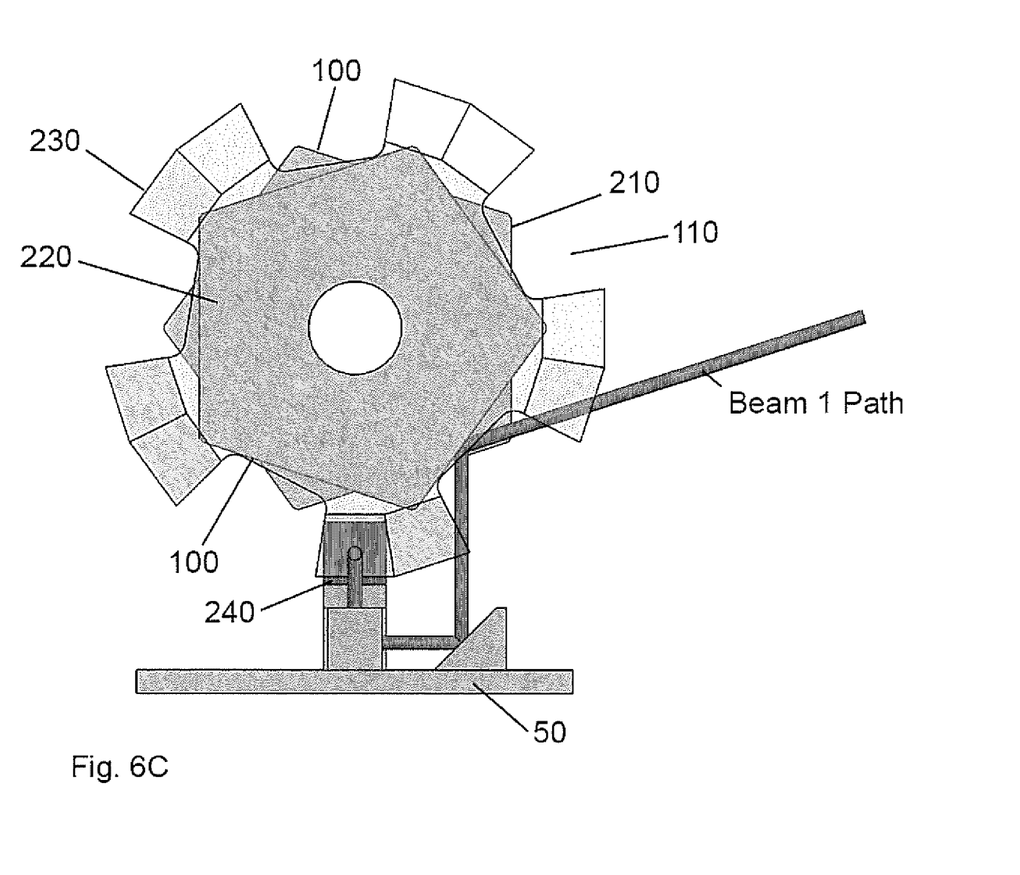

The rotation of inner scanning polygon structure 210, outer scanning polygon structure 220 and faceted beam steering element 230 is synchronized with a pulsed laser source 60 whereby, during each laser pulse, the respective pairs of beam switching surfaces 120 and 120' are disposed at a predetermined angle (e.g., 45 degrees) with respect to the incoming laser beam 60' so as to direct beam 60' toward beam path guide mirror assembly 50 and along the beam 1 path.

Rotation timing issues that may cause undesirable deviation from the preferred beam reflection direction may be analyzed and corrected using known engineering design tools.

Figure 7A:
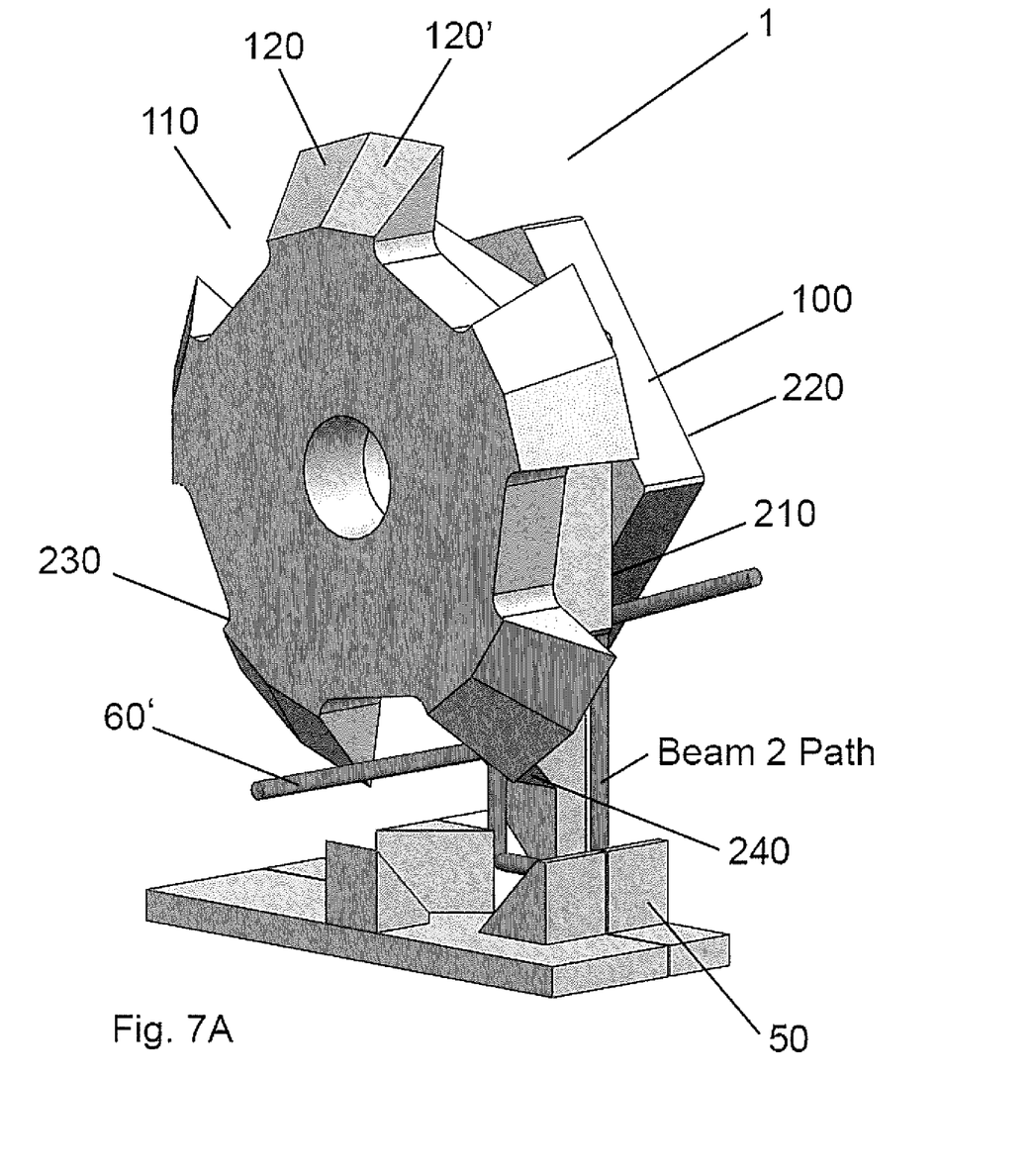
FIGS. 7A-C depicts the embodiment of FIGS. 6A-C with a laser beam along a beam 2 path.
Figure 7B:
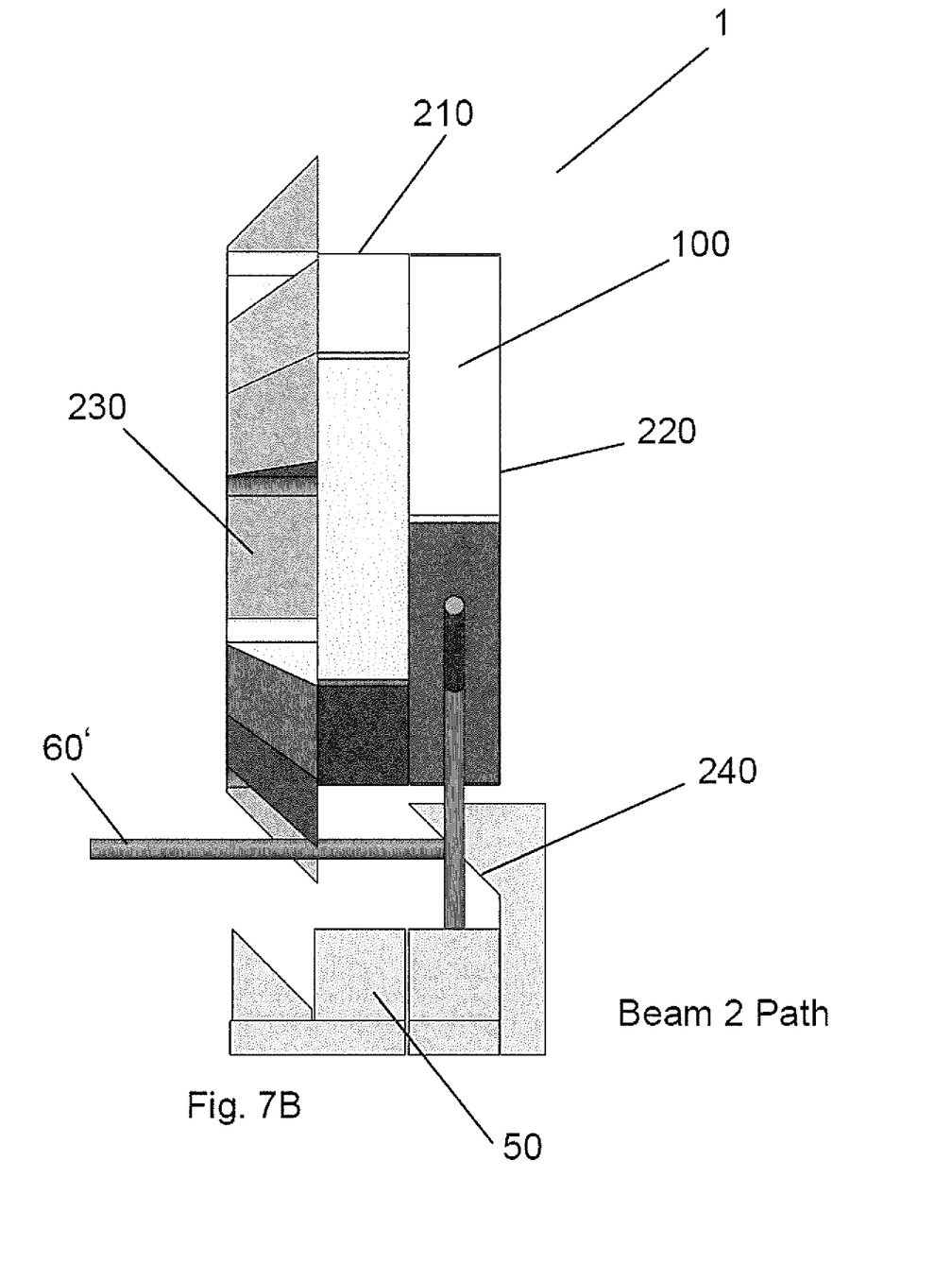
Figure 7C:
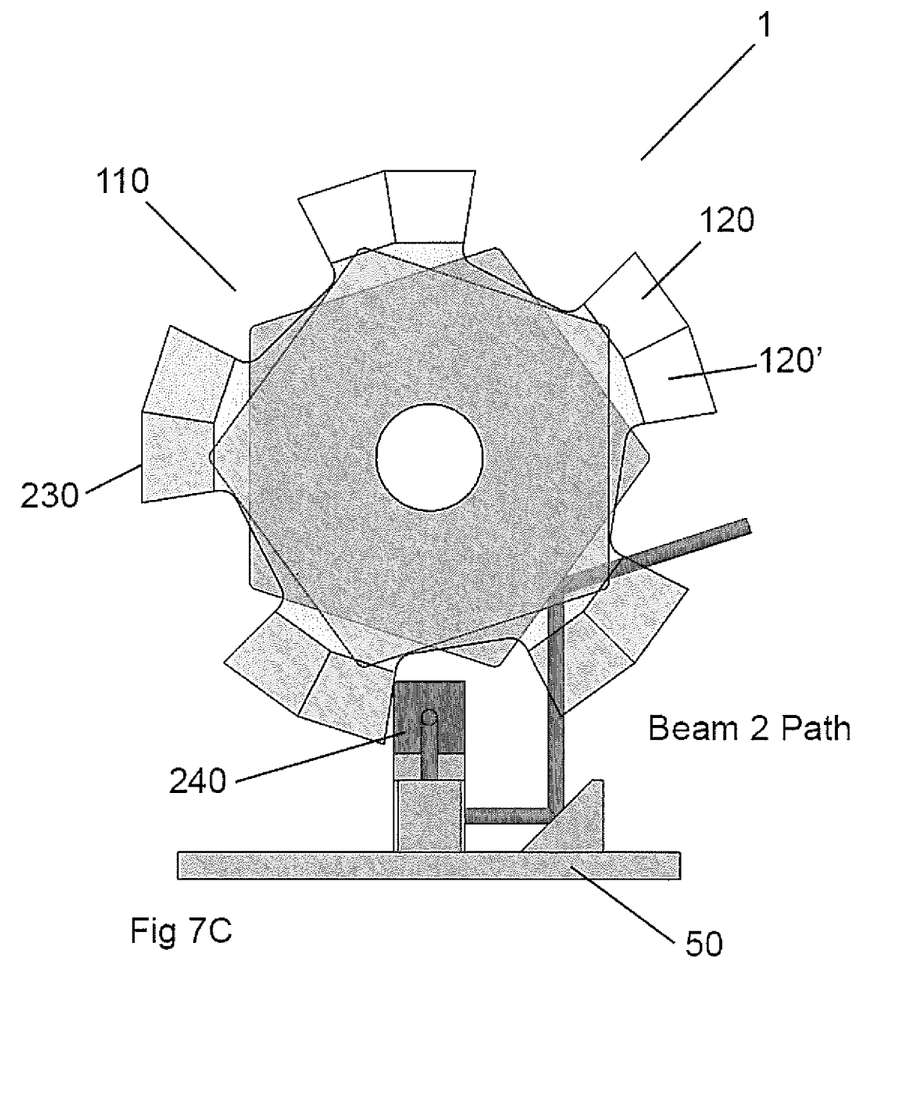

In the described embodiment, only beam 1 path is used by rotating inner scanning polygon 210. Beam 2 path is created when apertures 110 pass across the path of beam 60. When beam 60' passes through apertures 110 in faceted beam steering element 230, beam 2 is incident upon stationary reflective surface 240 that is angularly disposed thereto and directs beam 60' to outer scanning polygon structure 220. The beam on beam path 2 is therefore not affected by rotation or timing issues.

In this manner, a scanning polygon assembly is provided that is mechanically simple, eliminates dead scanning periods, is easy to fabricate and can be used with a pulsed laser scanning source.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by any claims in any subsequent application claiming priority to this application.

For example, notwithstanding the fact that the elements of such a claim may be set forth in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the invention.

What is claimed:

1. A LIDAR system comprising:
   a laser source for emitting a beam;
   an inner scanning polygon and an outer scanning polygon each comprising a plurality of facets disposed on a lateral surface thereof;
   a faceted beam steering element comprising a plurality of outwardly depending, radially-disposed, spaced-apart beam switching surfaces defining a plurality of apertures there between;
   the faceted beam steering element, the inner scanning polygon and outer scanning polygon fixedly connected to each other and configured to rotate about a common axis;
   the inner scanning polygon and outer scanning polygon having a predetermined angular shift between them;
   a stationary reflective surface;
   the beam configured to be incident upon the stationary reflective surface when passing through the aperture at a first rotational position of the faceted beam steering element whereby the beam is directed along a first beam path comprising a facet of the inner or outer scanning polygon; and;

the beam incident upon a beam switching surface at a second rotational position of the faceted beam steering element whereby the beam is directed along a second beam path comprising a facet of the respective other inner or outer polygon.

* * * * *